United States Patent [19]
Alper

[11] Patent Number: 5,437,793
[45] Date of Patent: Aug. 1, 1995

[54] COAGULANT FOR OIL GLYCERIDE/ISOBUTYL METHACRYLATE COMPOSITION AND METHOD OF USE

[75] Inventor: Hal Alper, Brooklyn, N.Y.

[73] Assignee: Mansfield & Alper, Inc., Gainesville, Ga.

[21] Appl. No.: 74,114

[22] Filed: Jun. 8, 1993

[51] Int. Cl.⁶ .................... B01J 13/00; C02F 1/54; C02F 1/56
[52] U.S. Cl. .................... 210/728; 210/733; 210/925; 252/314; 252/315.1; 252/315.4; 524/313
[58] Field of Search ............ 252/315.1, 315.4; 210/732, 733, 734, 925, 728; 524/313, 917

[56] References Cited

U.S. PATENT DOCUMENTS

| | | | |
|---|---|---|---|
| 2,418,920 | 4/1947 | Berger et al. | 252/315.4 X |
| 3,067,154 | 12/1962 | Sterling | 524/313 |
| 3,755,189 | 8/1973 | Gilchrist et al. | 252/315.4 |
| 3,775,448 | 11/1973 | Guhr et al. | 252/315.4 X |
| 3,776,864 | 12/1973 | Woerner | 524/313 X |
| 3,821,109 | 6/1974 | Gilchrist et al. | 210/749 |
| 3,835,049 | 9/1974 | King | 210/758 |
| 3,917,528 | 11/1975 | Orban et al. | 210/680 |
| 3,977,969 | 8/1976 | Zall | 210/666 |
| 4,156,040 | 5/1979 | Swider et al. | 427/226 |
| 4,200,561 | 4/1980 | Chang | 524/313 X |
| 4,420,400 | 12/1983 | Weitzen | 210/710 |
| 4,420,573 | 12/1983 | Fogg et al. | 523/333 |
| 4,502,975 | 3/1985 | Kobayashi et al. | 252/315.1 |
| 4,519,918 | 5/1985 | Ericsson et al. | 210/680 |
| 4,786,717 | 11/1988 | Bretches et al. | 528/491 |
| 4,810,395 | 3/1989 | Levy et al. | 252/315.4 X |
| 5,326,394 | 7/1994 | Cobb | 524/313 X |

FOREIGN PATENT DOCUMENTS 859836  2/1978  Belgium.

Primary Examiner—Richard D. Lovering
Attorney, Agent, or Firm—Hopkins & Thomas

[57] ABSTRACT

The invention discloses methods of making oil coagulant compositions, the oil coagulants made thereby and processes for using the coagulants to coagulate oil that has been spilled on water. The coagulant comprises a glyceride, such as, for example, the drying oil linseed oil, a polymer, such as, for example, poly(isobutyl methacrylate), and a solvent, such as, for example, 2, 2, 4-trimethyl-1, 3-pentanediol monoisobutyrate. The coagulant of the present invention coagulates oil independent of both agitation and temperature, and may be used in both salt and fresh water. After the coagulant has coagulated the spilled oil, the coagulated oil may be readily mechanically removed from the water such that at least 99.9% of the oil is removed from the water and only a faint trace of oil remains in the water.

6 Claims, No Drawings

COAGULANT FOR OIL GLYCERIDE/ISOBUTYL METHACRYLATE COMPOSITION AND METHOD OF USE

FIELD OF THE INVENTION

The invention generally relates to a chemical composition that may be used as a coagulant and/or viscoelastic rheology modifier for oil and a method of making and using the same. More specifically, the invention is drawn to the use of particular combinations of a glyceride, a polymer and a solvent that may be used as a coagulant to coagulate oil that has been spilled on water. An embodiment of the invention includes mixing linseed oil with poly(isobutyl methacrylate) under a nitrogen blanket at a temperature of 420° F. to 450° F. and subsequently adding a solvent to the mixture.

BACKGROUND OF THE INVENTION

The present invention relates to the treatment of oil slicks and spills on the surface of bodies of water and more particularly, to methods of making and using compositions that will coagulate and/or enhance the viscoelasticity of the spilled oil such that the spilled oil may be readily removed from the water surface.

Unfortunately, repeated incidences of oil spilling in both fresh and salt water are well known. Recent history has evidenced the disastrous results that are caused by oil spills. Spilled oil causes damage to marine life, contamination of the water itself, damage to the shoreline and damage to birds and other wild life that are dependent upon the contaminated water. Because oil spills cause great losses both environmentally and, of course, financially, compositions, methods of making compositions, and methods of using compositions that will control an oil spillage such that spilled oil may be readily removed from a water surface is in great need.

Several methods of controlling oil spills are known. Various mechanical devices such as fences, booms, and skimmers have been used to physically contain or remove oil that has been spilled on a water surface.

In addition, several types of oil absorbants have also been used in the past, such as, for example, straw. Various chemical treatments have also been used to either contain or coagulate spilled oil. For example, U.S. Pat. No. 3,755,189 to Gilchrist, et al. teaches a composition for the control of oil floating on water that comprises a drying oil, a solvent and a catalyst that are used in combination as a composition that is able to confine oil that is floating on the surface of water. In addition, U.S. Pat. No. 3,977,967 to Zall teaches a method of containing oil spills that uses a polymer of high molecular weight that is able to gel or coagulate the spilled oil such that the coagulated oil may be easily raked off the surface of the water.

Although the Gilchrist and Zall compositions and methods, and others, teach moderately effective means for removing spilled oil from a water surface, heretofore, a method of making a composition, the resulting composition, and a method of using the resulting composition that is able to confine, coagulate and control spilled oil in both calm and rough choppy water has not been known. Due to the nature of oil and water, i.e., the lighter components of oil typically evaporate from the surface of the water in 24–28 hours, and the heavier components of the oil typically sink below the surface of the water and eventually form an emulsion with the water; previous compositions and methods have not been effective to remove the spilled oil from the water surface, especially in rough waters.

It is therefore an object of the present invention to provide a method of making a composition, the composition itself, and a method for using the composition that has the ability to coagulate oil and in particular, No. 6 fuel oil, heavy crude oil, sour crude and non-detergent motor oil.

It is also an object of the present invention to provide a composition that will coagulate both the heavy and light components of oil, and will float on the surface of the water, thereby preventing the heavier oil components from sinking beyond recovery.

It is also an object of the present invention to provide a method for making the glyceride/polymer/solvent coagulant composition of the present invention.

It is a further object of the present invention to provide a composition that is able to coagulate oil spills whereby said coagulation is independent of the temperature and type of water in which the spill has occurred.

It is also an object of the present invention to provide a coagulant that effectively coagulates independent of agitation rate or coagulation time.

It is yet another object of the present invention to provide a coagulant composition that removes 99.9% of the oil spilled in water such that only a trace amount, if any, remains.

DETAILED DESCRIPTION

The present invention entails a unique method of making a coagulant chemical, the chemical itself, and a method for using the coagulant chemical composition to coagulate oil spills. The coagulant is comprised of a glyceride, a polymer and a solvent. In a preferred embodiment, the coagulant is comprised of linseed oil, poly(isobutyl methacrylate), and 2, 2, 4-trimethyl-1,3-pentanediol-monoisobutyrate.

The glyceride component of the coagulant is derived from glycerin and carboxylic acids, such as linseed fatty acid to form monoglycerides, diglycerides and triglycerides. The glycerides may be derived from vegetable or animal origin. Vegetable oils are obtained by cold pressing the seeds of a plant to obtain the oil contained therein. Of the vegetable oils, drying oils such as linseed and tung oil; semi-drying oils such as soybean and cotton seed oil; and non-drying oils such as coconut oil may be used as the glyceride component of the invention. Animal oils such as, for example, tallow and lard may also be used as the glyceride-component of the invention.

The glyceride component of the coagulant composition is preferably a drying oil. The preferred drying oil of the present invention is linseed oil which may be obtained from Cargill, Inc., as Supreme Linseed Oil. The glyceride Should comprise from 35 to 40% of the coagulant, most preferably 37%, or, of the intermediate composition poly (linseed oil/isobutyl methacrylate), the drying oil should comprise from 72% to 77%, or most preferably, 74.62%.

The polymer component of the coagulant may be derived from α and β-unsaturated carbonyl compounds. The polymer component of the invention is the resultant product of a monomer which is an ester of an acrylic acid, crotonic acid, isocrotonic acid, methacrylic acid, sorbic acid, cinnamic acid, maleic acid, fumaric acid, and methyl methacrylic acid.

The following list is exemplary of a few examples of such polymers which cover any number of reaction possibilities between the esters of such compounds. Acrylate polymers, methyl methacrylate polymers, methyl/n-butyl methacrylate polymers, methacrylate copolymers, ethyl methacrylate, N-butyl methacrylate, isobutyl methacrylate, N-butyl/isobutyl methacrylate copolymers.

Preferably the polymer is poly(isobutyl methacrylate) which may be obtained from Du Pont as Elvacite 2045. Ideally, the polymer percentage of the coagulant should range from 10% to 15%, or preferably 13%, or, with respect to the intermediate composition poly(linseed oil/isobutyl methacrylate) the polymer should range from 23% to 28%, or preferably 25.38%.

The solvent, or diluent component of the coagulant should generally comprise any liquid or mixture of liquids that is able to dissolve or dilute the intermediate coagulant composition poly (glyceride/polymer). The solvent/diluent should control the evaporation, desired flow and coalescing of the intermediate coagulant composition. And, in consideration of marine life, the toxicity of the solvent must be considered. More specifically, the solvent may be an aliphatic hydrocarbon, aromatic hydro-carbon, alcohols, ketones, ethers, aldehydes, phenols, carboxylic acids, carboxylates, synthetic chemicals and naturally occurring substances.

In addition, the solvent component of the coagulant may also be a previously specified glyceride where the composition is approximately 100 percent solids. In this case, toxicity from solvents is virtually eliminated and a product that is extremely viscous is formed which may be useful in certain applications.

Preferably the solvent is 2, 2, 4-trimethyl-1,3-pentanediol-monoisobutyrate. The preferred amount of the solvent is 50% of the coagulant composition, although, the total solvent percentage of the coagulant composition may range from 45% to 55%.

Methods of Making the Coagulant

The coagulant composition of the present invention is obtained through a synthesis process. The first step of the process involves mixing the glyceride and the polymer in their respective proportions. As stated above, the glyceride should range from 72% to 77% preferably 74.62%, and the polymer should range from 23% to 28%, preferably 25.38% of the glyceride/polymer intermediate composition. After this mixture has been mixed properly, the mixture should be placed under a nitrogen blanket and heated to a temperature in the range of 400° F. to 500° F., or more preferably the temperature range of from 425° F. to 450° F.

The mixture should be heated at that temperature until a clear pill test indicates that the action has reached its end point, i.e., a drop of the reaction mixture when placed on a clear glass plate is clear. When a clear pill test indicates that the reaction has reached its endpoint, the mixture should be cooled to a temperature below 200° F., or most preferably to 180° F. The solvent component of the coagulant is then added to the mixture to form a solution which is heated to a temperature of from about 220° F. to about 280° F., or preferably to approximately 250° F. The solution is then filtered to remove particulate and unmixed components using a 200 micron filter bag.

The end coagulant product made according to the above-described process generally has the following properties:

| | |
|---|---|
| boiling point | 471° F. |
| appearance | pale yellow clear oily liquid |
| odor | very mild |
| water solubility | negligible |
| % non-volatile material | 50 |
| flash point | 247° F. |
| flammability | combustible liquid |

Methods of Use

The glyceride/polymer/solvent coagulant composition may be used to coagulate spilled oil through a process of generally applying the coagulant to the surface of the oil spill. The coagulant may be sprayed on top of the oil spill from a plane or boat, or the coagulant may be introduced at only one site, or an edge of the spill. When the coagulant is sprayed on top of the oil spill, no agitation is required in order for the coagulant to coagulate the spilled oil. When the coagulant is introduced at a site of the oil spill, however, agitation may be required depending upon the wave action of the water in combination with the properties of the coagulant, i.e., the wave action may be, itself, sufficient to spread the coagulant throughout the oil spill. Preferably, the amount of coagulant used in terms of the amount of spilled oil should be from 5 to 15% of the spilled oil. Our studies have shown that if, as compared to the amount of oil spilled, an amount of coagulant equal to 5% of the spilled oil is used, the coagulant will remove 99% of the spilled oil, and if an amount of coagulant is used that is equal to 10 to 15% of the spilled oil, the coagulant will remove 99.9% of the spilled oil. When 99.9% of the spilled oil has been coagulated and removed only a trace amount of oil remains in the water.

A unique feature of the present inventive coagulant and the methods of using the coagulant is that no agitation is required to mix the coagulant with the spilled oil when the coagulant is sprayed on top of the oil spill. In addition, as stated, if the coagulant is introduced at the site of the spill, depending upon the wave action of the water in combination with the nature of the coagulant used, agitation may not be required because the wave action is sufficient to disperse the coagulant throughout the spill. And, when agitation has been used to simulate very rough waters, the coagulant acts very quickly (less than one (1) minute) to coagulate both the light and heavy components of the spilled oil despite extreme agitation. The herein disclosed coagulant and method of using the same is therefore agitation independent.

In addition, our studies have also shown that the coagulant and methods of using the same will coagulate oil that has been spilled on water regardless of water or air temperature and, the coagulant works in both salt water and fresh water.

After the coagulant has coagulated the spilled oil, the admixture should simply be removed from the water by any mechanical means such as, for example, scooping type devices, that are well known in the art.

The following examples illustrate the particular aspects of the invention which, however, are not to be construed as limited thereby.

EXAMPLES

Example 1

1000 g. of supreme linseed oil was charged to a three neck, round bottom flask, equipped with a glass agitator, reflux condenser, Deanstark trap, and Nitrogen sparge line. The flask was insulated with glass wool, and the bottom was covered with a heating mantel. A nitrogen line and agitator were then turned on, and the flask was heated to 235° F. at a rate of 4 degrees F. per minute. When the temperature reached 235° F., 340 g. of Du Pont Elvacite 2045 [poly (isobutyl methacrylate)] was charged. As all of the 2045 material was charged, the temperature tried to drop to around 200° F. We therefore keep heating the flask to a temperature range of 425° F.–450° F. at a rate of 2 degrees F. per minute. While heating, clear pill tests were conducted to determine whether or not the reaction was completed. The clear pill test was obtained at 286° F. This batch was then cooled down by removing the heating mantel. When cooled to 180° C., 1340 g of 2,2,4-Trimethylpentandiol-1,3-Monoisobutyrate was charged. Cooling was continued down to 250° F. The batch was then filtered using a 200 micron filter bag, cooled to room temperature and stored.

EXAMPLE 2

1000 g. of soybean oil was charged to a three neck round bottom flask, equipped with a glass agitator, reflux condenser, Deanstark trap, and Nitrogen sparge line. The flask was insulated with glass wool, and the bottom was covered with a heating mantel. A nitrogen line and agitator was then turned on and the flask was heated to 235° F., and charged with 340 g. of polymethyl methacrylate. As the polymethyl methacrylate was charged, the temperature tried to drop to around 200° F. We therefore kept heating the flask until a temperature range of 425°–450° F. was reached at a rate of 2 degrees F. per minute. While heating, we checked for the clear pill test, which was obtained at 286° F. The batch was then cooled down by removing the heating mantel. At 180° F., 1340 g. of 100% anhydrous Iso-propyl alcohol was charged. At 150° F., the batch was filtered using a 200 micron filter bag. The batch was then cooled to room temperature and stored.

Example 3

1000 g. of Supreme Linseed Oil was charged to a three neck round bottom flask, equipped with a glass agitator, reflux condenser, Deanstart trap, and Nitrogen sparge line. The flask was insulated with glass wool, and the bottom was covered with a heating mantel. A nitrogen line and agitator were then turned on, and the flask was heated to 235° F. at a rate of 4 degrees F. per minute. When the temperature reached 235° F., a 340 g. of Du Pont Elvacite 2045 [poly(isobutyl methacrylate)] was charged. As all of the 2045 material was charged, the temperature tried to drop to around 200° F. We therefore kept heating the flask until a temperature range of 425°–450° F. at a rate of 2 degrees F. per minute was reached. While heating, we checked for the clear pill test, which was obtained at 286° F. The batch was then cooled down by removing the heating mantel. At 180° C., 1340 g. of Supreme Linseed Oil was charged and cooled down to 250° F. At 250° F. the batch was filtered using 200 micron filter bag. The batch was then cooled to room temperature and stored.

Example 4

A sample of the drying oil/polymer/solvent coagulant prepared according to Example 3 was supplied and identified to Leberco Testing Incorporated to determine the coagulant's ability to coagulate spilled oil. The coagulant product was evaluated for its coagulating properties in cold fresh water and cold simulated salt water in which an oil spill was simulated.

The coagulant was evaluated for its ability to remove: (1) non-detergent motor oil; (2) number 6 fuel oil; (3) heavy crude bottoms; (4) sour crude; (5) sweet crude; and (6) number 2 fuel oil.

The testing procedure used incorporated tap water at 20° C. and at 10° C. and simulated salt water which was prepared in accordance with ASTM D1141 (Substitute Ocean Water) testing procedures also at 20° C. and 10° C. The oil concentration on the water was at 10% of the water volume. The coagulant was evaluated at 5, 10 and 15% by volume of the oil concentration with agitation times ranging from 1–3 minutes and coagulation times at 0.5 and 2 minutes. Following the addition of the coagulant and agitation, and coagulation time allowed, the oil-coagulant admixture product was removed by mechanical means of scooping it out.

The results indicated that the coagulant was not effective with the two oils number 2 fuel oil and sweet crude. However, the product was effective in removing nondetergent motor oil, number 6 fuel oil, heavy crude bottoms and sour crude. The coagulated mass was easily removed as a gummy mass which was attached to the impeller mixing blade and was easily scoopable so that the coagulated oil was removed with a spoon. Furthermore, it was observed that (a) temperature and water type were not factors; (b) agitation time and coagulation time were also not major factors; (c) the coagulate concentration of 5–15% to oil was adequate, whereas the larger percentage would remove 99.9% of the oil and the lower percentage would remove about 99% of the oil.

Based upon the testing conducted, the linseed oil/polymer/solvent coagulant was determined to be an effective coagulant for the removal of non-detergent motor oil, number 6 fuel oil, heavy crude bottoms and sour crude at coagulant to oil concentrations of 5 to 15% and oil on water concentration of 10%. The water was either fresh or salt at 10°–20° C.

The removal of oil from water was 99.99% effective at all times following coagulation. The coagulated/oil mass was physically removed by scooping it out of the water or through its adherence to the mixture blade.

Example 5

The coagulant of Examples 3 and 4 was determined to be an effective coagulating agent in removing motor oil and No. 6 fuel oil from both fresh and salt water where the oil concentration was about 1% in water and nearly complete removal was achieved at a 1–1.5% of coagulant to oil concentration.

The purpose of Example 5 was to determine the efficacy of the coagulant in coagulating oil in water by simulating an oil spill occurring in either fresh or salt water whereby the coagulated oil could ultimately be removed from the water by some mechanical means. The coagulant was evaluated in both fresh and salt water which was prepared in accordance with ASTM-D-1141 ("Substituted Ocean Water"). The parameters used in this experiment were as follows:

| | |
|---|---|
| Oil used - (at a 1% in Water) | Valvoline, non-detergent SAE 30 Motor Oil or Number 6 Fuel Oil |
| Water used - | Tap and Substitute Ocean Water |

-continued

| Conditions used - | |
|---|---|
| Temperature | 20° C. |
| Coagulant concentration as a Percent of Oil | 5, 10 and 15 |
| Agitation time (minutes) | 1, 2 and 3 |
| Coagulation time (minutes) | 0.5 and 2 |

Following the coagulant addition to the oil/water mixture, and agitation and coagulation, the coagulated mass was removed by mechanically scooping off the gummy, coagulated mass.

The results were as follows: (a) temperature and water type did not enter into the coagulation process; (b) agitation and coagulation time were not factors for coagulation performance; (c) percent of coagulant was a major factor in performance based upon its concentration relative to the oil's concentration.

The findings for Example 5 indicate that coagulant concentrations of 5% to oil concentration generates oil removal of better than 99%. Concentration of 10–15% of coagulant to oil generates oil removal better than 99.9% with only a faint trace of oil remaining on the water surface. Therefore, under the conditions of the testings conducted, the coagulant efficacious in coagulating motor and number 6 fuel oil in fresh and salt water at concentrations of 5–15% of coagulant to oil where the oil concentration is 1% in water.

The invention has been described in detail with particular reference to the preferred embodiments. It will be understood that variations and modifications can be effected within the spirit and scope of the invention and the claims appended hereto.

I claim:

1. A composition comprising the product of a synthesis process between 72–77% of a glyceride and 23–28% of a polymer; and
   45–55% solvent, wherein said polymer is poly(isobutyl methacrylate).

2. A composition comprising the product of a synthesis process between 72–77% of a glyceride and 23–28% of a polymer; and
   45–55% solvent, wherein said polymer is Elvacite 2045.

3. A composition comprising a synthetic reaction product of about 74.6% linseed oil and about 25.4% poly (isobutyl methacrylate) which is further mixed with about 50% 2, 2, 4-trimethyl-1, 3-pentanediol monoisobutyrate.

4. A method of using a composition to coagulate oil that has been spilled on water comprising the steps of:
   (a) applying a composition manufactured from linseed oil, poly(iso butyl methacrylate), and 2, 2, 4-trimethyl-1, 3-pentanediol monoisobutyrate to oil that has been spilled on water such that the percentage of said composition to said spilled oil ranges from 5–15%; and
   (b) allowing said composition and spilled oil to admix such that said composition coagulates said spilled oil.

5. The method of claim 4 wherein said coagulated oil is mechanically removed from the water.

6. A method of using a composition to coagulate oil that has been spilled on water comprising:
   (a) applying a composition that has been manufactured from a glyceride, a polymer and a solvent to oil that has been spilled on water such that the percentage of said composition to said spilled oil ranges from about 5 to 15%; and
   (b) allowing said composition and spilled oil to admix such that said composition coagulates said spilled oil, wherein the polymer is poly(isobutyl methacrylate).

* * * * *